(12) United States Patent
Frazier et al.

(10) Patent No.: US 9,342,432 B2
(45) Date of Patent: May 17, 2016

(54) HARDWARE PERFORMANCE-MONITORING FACILITY USAGE AFTER CONTEXT SWAPS

(75) Inventors: Giles R. Frazier, Austin, TX (US); Brian R. Mestan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1196 days.

(21) Appl. No.: 13/313,557

(22) Filed: Dec. 7, 2011

(65) Prior Publication Data

US 2012/0254670 A1 Oct. 4, 2012

Related U.S. Application Data

(63) Continuation-in-part of application No. 13/079,189, filed on Apr. 4, 2011, now Pat. No. 8,868,886.

(51) Int. Cl.
*G06F 11/34* (2006.01)

(52) U.S. Cl.
CPC ........ *G06F 11/348* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 5,381,533 A | 1/1995 | Peleg et al. | |
| 5,796,633 A * | 8/1998 | Burgess | G06F 11/3495 702/187 |
| 5,875,324 A | 2/1999 | Tran et al. | |
| 5,970,439 A | 10/1999 | Levine et al. | |
| 6,170,083 B1 | 1/2001 | Adl-Tabatabai | |
| 6,253,338 B1 | 6/2001 | Smolders | |
| 6,351,844 B1 | 2/2002 | Bala | |
| 6,513,133 B1 | 1/2003 | Campbell | |
| 6,539,500 B1 | 3/2003 | Kahle et al. | |
| 6,647,491 B2 | 11/2003 | Hsu et al. | |
| 6,920,549 B1 * | 7/2005 | Ukai | G06F 9/3804 712/207 |
| 7,000,095 B2 | 2/2006 | Jeppesen et al. | |
| 7,076,640 B2 | 7/2006 | Kadambi | |
| 7,103,877 B1 | 9/2006 | Arnold et al. | |
| 7,155,718 B1 * | 12/2006 | Joffe | G06F 9/3824 712/216 |

(Continued)

OTHER PUBLICATIONS

Office Action in U.S. Appl. No. 13/079,189 mailed Jan. 8, 2014, 17 pages (pp. 1-17).

(Continued)

*Primary Examiner* — Eric Coleman
(74) *Attorney, Agent, or Firm* — Mitch Harris, Atty at Law, LLC; Andrew M. Harris; Steven L. Bennett

(57) ABSTRACT

A performance monitoring technique provides task-switch immune operation without requiring storage and retrieval of the performance monitor state when a task switch occurs and provides accurate performance monitoring information. When a hypervisor signals that a task is being resumed and the application privilege level has been entered, it provides an indication, which starts a delay timer. The delay timer is resettable in case a predetermined time period has not elapsed when the next task switch occurs. After the delay timer expires, analysis of the performance monitor measurements is resumed, which prevents an initial state, a state due to execution of the operating system or hypervisor, or a state remaining from a previous task from corrupting the performance monitoring results. The performance monitor may be or include an execution trace unit that collects branch information in a current program execution trace.

21 Claims, 5 Drawing Sheets

(56) References Cited

U.S. PATENT DOCUMENTS

| | | | |
|---|---|---|---|
| 7,243,350 B2 | 7/2007 | Lindwer | |
| 7,315,795 B2 | 1/2008 | Homma | |
| 7,469,362 B2 | 12/2008 | Hudson et al. | |
| 7,490,229 B2 | 2/2009 | Tremblay et al. | |
| 7,496,908 B2 | 2/2009 | DeWitt, Jr. et al. | |
| 7,603,545 B2 | 10/2009 | Sunayama et al. | |
| 7,657,893 B2 | 2/2010 | Armstrong et al. | |
| 7,694,281 B2 | 4/2010 | Wang et al. | |
| 7,765,387 B2 | 7/2010 | Sunayama et al. | |
| 7,877,642 B2 | 1/2011 | Ding et al. | |
| 7,949,854 B1 | 5/2011 | Thaik et al. | |
| 8,042,007 B1 | 10/2011 | Chan et al. | |
| 8,261,244 B2 | 9/2012 | Pietrek | |
| 8,281,304 B2 | 10/2012 | Kimura | |
| 8,407,518 B2 | 3/2013 | Nelson et al. | |
| 8,612,730 B2 | 12/2013 | Hall et al. | |
| 8,612,986 B2 * | 12/2013 | Accapadi | G06F 9/4812 710/262 |
| 2002/0066081 A1 | 5/2002 | Duesterwald et al. | |
| 2004/0187120 A1 * | 9/2004 | Moore | G06F 9/4881 718/100 |
| 2005/0081107 A1 | 4/2005 | DeWitt et al. | |
| 2005/0132363 A1 | 6/2005 | Tewari et al. | |
| 2005/0210454 A1 | 9/2005 | DeWitt et al. | |
| 2005/0223364 A1 | 10/2005 | Peri et al. | |
| 2006/0005180 A1 | 1/2006 | Nefian et al. | |
| 2006/0080531 A1 | 4/2006 | Sinha et al. | |
| 2006/0168432 A1 | 7/2006 | Caprioli et al. | |
| 2007/0294592 A1 | 12/2007 | Ashfield et al. | |
| 2008/0086597 A1 | 4/2008 | Davis et al. | |
| 2008/0171598 A1 | 7/2008 | Deng | |
| 2008/0222632 A1 | 9/2008 | Ueno et al. | |
| 2009/0037709 A1 | 2/2009 | Ishii | |
| 2009/0254919 A1 | 10/2009 | Jayaraman et al. | |
| 2010/0017791 A1 | 1/2010 | Finkler | |
| 2010/0306764 A1 | 12/2010 | Khanna | |
| 2011/0107071 A1 | 5/2011 | Jacob (Yaakov) | |
| 2012/0005462 A1 | 1/2012 | Hall et al. | |
| 2012/0005463 A1 | 1/2012 | Mestan et al. | |
| 2012/0254837 A1 | 10/2012 | Frazier et al. | |
| 2012/0323806 A1 | 12/2012 | Abrams et al. | |
| 2013/0055033 A1 | 2/2013 | Frazier et al. | |

OTHER PUBLICATIONS

Shi, et al., "Analyzing the Effects of Trace Cache Configurations on the Prediction of Indirect Branches", Journal of Instruction-Level Parallelism, Feb. 2006, 24 pages (pp. 1-24 in pdf), Raleigh, NC.

Zagha, et al.,"Performance Analysis Using the MIPS R10000 Performance Counters", Proceedings of the 1996 ACM/IEEE Conference on Supercomputing, Nov. 1996, 20 pages (pp. 1-20 in pdf), Pittsburgh, PA.

Nataraj, et al., "The Ghost in the Machine: Observing the Effects of Kernel Operation on Parallel Application Performance", International Conference for High Performance Computing, Networking, Storage and Analysis, Nov. 2007, 12 pages (pp. 1-12 in pdf), Reno, NV.

Anonymous, "Fast Identification of Previously Retrieved Callstacks", ip.com document IPCOM000200962D, Nov. 2010, 3 pages (pp. 1-3 in pdf).

Intel 64 and IA-32 Architectures Software Developers Manual, vol. 3A: System Programming Guide, Part 1, Mar. 2010, 812 pages (pp. 1-812 in pdf), US.

Intel Itanium 2 Processor Reference Manual for Software Development and Optimization, May 2004, 196 pages (pp. 1-196 in pdf), US.

"Intel 64 and IA-32 Architectures Optimization Reference Manual", Jun. 2011, 774 pages (pp. 1-774 in pdf), US.

Bala, et al., "Dynamo: A Transparent Dynamic Optimization System", In Proceedings of Programming Language Design and Implementation (PLOD), 2000, pp. 1-12, US.

Bond, et al., "Probabilistic Calling Context", In Proceedings of Object Oriented Programming Systems Languages and Applications (OOPSLA) 2007, 15 pages( pp. 1-15 in pdf), US.

Odaira, et al., "Efficient Runtime Tracking of Allocation Sites in Java", In Proceedings of Virtual Execution Environments (VEE), 2010, 12 pages (pp. 1-12 in pdf), US.

Lu, et al., "Design and Implementation of a Lightweight Dynamic Optimization System", Journal of Instruction Level Parallelism, Apr. 2004, 24 pages (pp. 1-24 in pdf), US.

Office Action in U.S. Appl. No. 12/828,697 mailed on Feb. 7, 2013, 27 pages (pp. 1-27 in pdf).

Rotenberg, et al., "Trace cache: a low latency approach to high bandwidth instruction fetching", Proceedings of the $29^{th}$ Annual IEEE/ACM International Symposium on Microarchitecture, Dec. 2-4, 1996, pp. 24-34, xii+359, IEEE Comput. Soc. Press, Paris, FR.

Jacobson, et al., "Trace Preconstruction", Proceedings of $27^{th}$ International Symposium in Computer Architecture, Jun. 14, 2000, pp. 37-46, ACM vi+328, Vancouver, BC, CA.

Merten, et al., "A hardware-driven profiling scheme for identifying program hot spots to support runtime optimization", Proceedings of the $26^{th}$ Annual International Symposium on Computer Architecture, May 2-4, 1999, pp. 136-148, IEEE Comp. Soc. Press, Atlanta, GA.

Patel, et al., "Improving trace cache effectiveness with branch promotion and trace packing", Proceedings of the 1998 $25^{th}$ Annual International Symposium on Computer Architecture, Jun. 27-Jul. 1, 1998, pp. 262-271, IEEE Computer Soc. Press, Barcelona, ES.

Yeh, et al., "Increasing the instruction fetch rate via multiple branch prediction and a branch address cache", ICS 1993 Proceedings of the $7^{th}$ International Conference on Supercomputing, Jul. 1993, pp. 67-76, Tokyo, JP.

Liu, "Predict Instruction Flow Based on Sequential Segments", IBM Technical Disclosure Bulletin, Apr. 1991, pp. 66-69, vol. 33, No. 11.

Shi, et al., "Analyzing the Effects of Trace Cache Configurations on the Prediction of Indirect Branches", Journal of Instruction-Level Parallelism, Feb. 2006, Raleigh, NC.

Zagha, et al.,"Performance Analysis Using the MIPS R10000 Performance Counters", Proceedings of the 1996 ACM/IEEE Conference on Supercomputing, Nov. 1996, Pittsburgh, PA.

Nataraj, et al., "Ghost in the Machine: Observing the effects of Kernel Operation on Parallel Application Performance", International Conference for High Performance Computing, Networking, Storage and Analysis, Nov. 2007, Reno, NV.

Anonymous, "Fast Identification of Previously-retrieved Callstacks", ip.com document IPCOM000200962D, Nov. 2010.

Intel 64 and IA-32 Software Developer's Manual, vol. 3B: System Programming, Mar. 2010, US.

Intel Itanium2 Processor Reference Manual for Software Development and Optimization, May 2004, US.

"Intel 64 and IA-32 Architectures Optimization Reference Manual", Jun. 2011, US.

Bala, et al., "Dynamo: A Transparent Dynamic Optimization System", In Proceedings of Programming Language Design and Implementation (PLOD), 2000, US.

Bond, et al., "Probabilistic Calling Context", In Proceedings of Object Oriented Programming Systems Languages and Applications (OOPSLA) 2007, US.

Odaira, et al., "Efficient Runtime Tracking of Allocation Sites in Java", In Proceedings of Virtual Execution Environments (VEE), 2010, US.

Lu, et al., "Design and Implementation of a Lightweight Dynamic Optimization System", Journal of Instruction Level Parallelism, Apr. 2004, US.

Mars, et al., "MATS: Multicore Adaptive Trace Selection", IEEE/ACM International Symposium on Code Generation and Optimization (CGO), $3^{rd}$ Workshop on Software Tools for MultiCore Systems, Apr. 6, 2008, 6 pgs., Boston, MA.

Merten, et al., "A Hardware Mechanism for Dynamic Extraction and Relayout of Program Hot Spots", Proceedings of the $27^{th}$ Annual International Symposium on Computer Architecture, May 2000, pp. 59-70, vol. 28, Issue 2, Vancouver, BC, Canada.

Office Action in U.S. Appl. No. 12/828,697 mailed on Feb. 7, 2013.

U.S. Appl. No. 12/828,697, Jul. 1, 2010, Hall, et al.

* cited by examiner

HARDWARE PERFORMANCE-MONITORING FACILITY USAGE AFTER CONTEXT SWAPS

This U.S. patent application is a Continuation-in-Part of U.S. patent application Ser. No. 13/079,189, filed on Apr. 4, 2011 and Claims priority thereto under 35 U.S.C. §120. The above-referenced parent U.S. patent Application is incorporated herein by reference, has at least one common inventor with, and is assigned to the same Assignee as, the present application.

BACKGROUND

1. Field of the Invention

The present invention is related to computer systems in which processor hardware facility state information is restored after context swaps, and in particular to techniques for ensuring that valid performance-monitoring hardware facility state information is used in subsequent activities.

2. Description of Related Art

In computer systems, hardware facilities in a processor can be provided for making performance measurements, tracking program execution, or other purposes. Computer system performance can be improved by monitoring the performance of the computer system or behavior of the programs. By observing characteristics of program execution, in particular, by observing characteristics of "hot spots", i.e., portions of a program that are executed most frequently, the program can be optimized, either off-line or on-the-fly, using the result of the performance measurements.

However, when a task is off-loaded, when the present execution of a program is terminated, to be resumed at a later time and the program is unloaded from memory, the state of the performance monitoring hardware is typically lost, making it difficult to monitor performance of tasks that are executed intermittently. In some cases the performance monitoring state may not be accessible so that the state cannot be stored and retrieved when the task is off-loaded.

A particular performance monitoring technique, as disclosed in the above-incorporated parent U.S. patent Application, entitled "TASK SWITCH IMMUNIZED PERFORMANCE MONITORING", delays performance monitoring operation, i.e., the use of the information collected by the hardware performance-monitoring facilities after a context switch occurs, to avoid using invalid performance monitoring states.

BRIEF SUMMARY

The invention is embodied in a method, a computer system and a processor core, in which performance monitoring information is not retained when a task is off-loaded and when a task is loaded for execution, performance monitoring analysis is postponed until a timer has elapsed, the timer being set when an application privilege level process begins execution after a context swap, so that the performance monitoring information does not reflect execution of the operating system and/or hypervisor.

The performance monitoring output or analysis may be delayed for a predetermined time period or instruction cycles, and is triggered by a computer program such as a hypervisor indicating that the application execution state has been entered after a context swap. After the delay has expired, the performance monitoring results may be analyzed.

The performance monitoring may be a program execution branch analysis that determines frequently executed execution paths by using successful branch predictions to provide an indication that a particular execution path is being taken and the application of the technique may be further postponed until the branch history information for the new task execution session has been updated and the effects of state information retained from a previous session or generated as an initialized state (e.g., reset state) has been attenuated.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION

The present invention encompasses techniques for program performance monitoring in computer systems in which program operation may be interrupted by context and/or task switching. Since the state of the hardware facilities that assist in performance monitoring are not generally restored, when a context swap occurs, the state of the performance monitoring hardware may reflect execution of the operating system or hypervisor. The present invention provides a mechanism for ensuring that the performance monitoring information obtained from a performance monitoring hardware facility reflects the actual execution of an application of interest by detecting that a write to the performance monitoring facility that indicates a restore due to the context swap, further detecting that the privilege level of the system has entered the application privilege level, indicating that program execution has resumed, and starting a timer. After the timer has elapsed, analysis of the performance monitoring results can be resumed. In a particular embodiment of the present invention, the performance monitoring collects trace segments from branch history information in order to locate program hotspots for optimization, or other reasons for which the trace segment information is desirable. The trace segment information is not gathered until the branch history information has been sufficiently updated for each new execution cycle, preventing information from previous execution cycles of the hypervisor, supervisor (operating system) or other programs from generating invalid segment analysis results.

Figure 1:
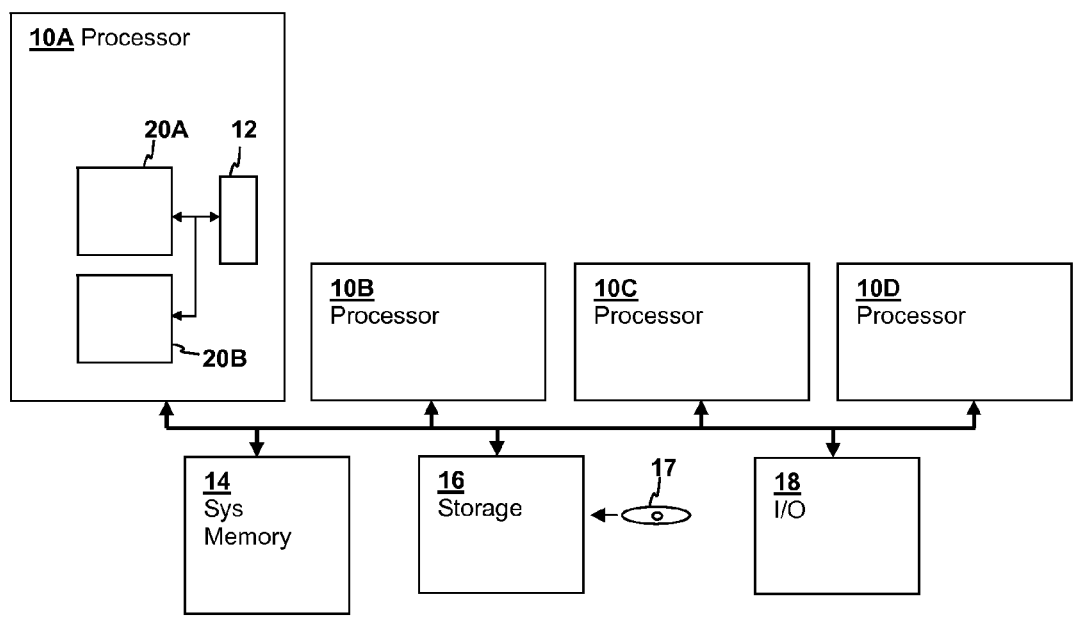
FIG. 1 is a block diagram illustrating a computer system including in which techniques according to an embodiment of the present invention are practiced.

FIG. 1 shows a processing system in accordance with an embodiment of the present invention. The depicted processing system includes a number of simultaneous multi-threading (SMT) processors 10A-10D. The depicted multi-processing system is illustrative, and processing systems in accordance with other embodiments of the present invention will have different configurations. Processors 10A-10D are identical in structure and include cores 20A-20B and local storage 12, which may be a cache level, or a level of internal system memory. Processors 10A-10D are coupled to main system memory 14, a storage subsystem 16, which includes non-removable drives and optical drives, for reading media such as a CD-ROM 17 for loading program code for execution by processors 10A-10D, including program code that reads and analyzes branching information provided by hardware performance monitoring units within processors 10A-10D, as well as operating system or hypervisor code that controls the switching of programs/tasks in accordance with embodiments of the present invention. The illustrated processing system also includes input/output (I/O) interfaces and devices 18 such as mice and keyboards for receiving user input and graphical displays for displaying information. While the system of FIG. 1 is used to provide an illustration of a system in which the performance monitoring methodology of the present invention is implemented, it is understood that techniques of the present invention can be implemented in other architectures. It is also understood that the present invention applies to other processors in accordance with embodiments of the present invention that may be used in a variety of system architectures.

Figure 2:
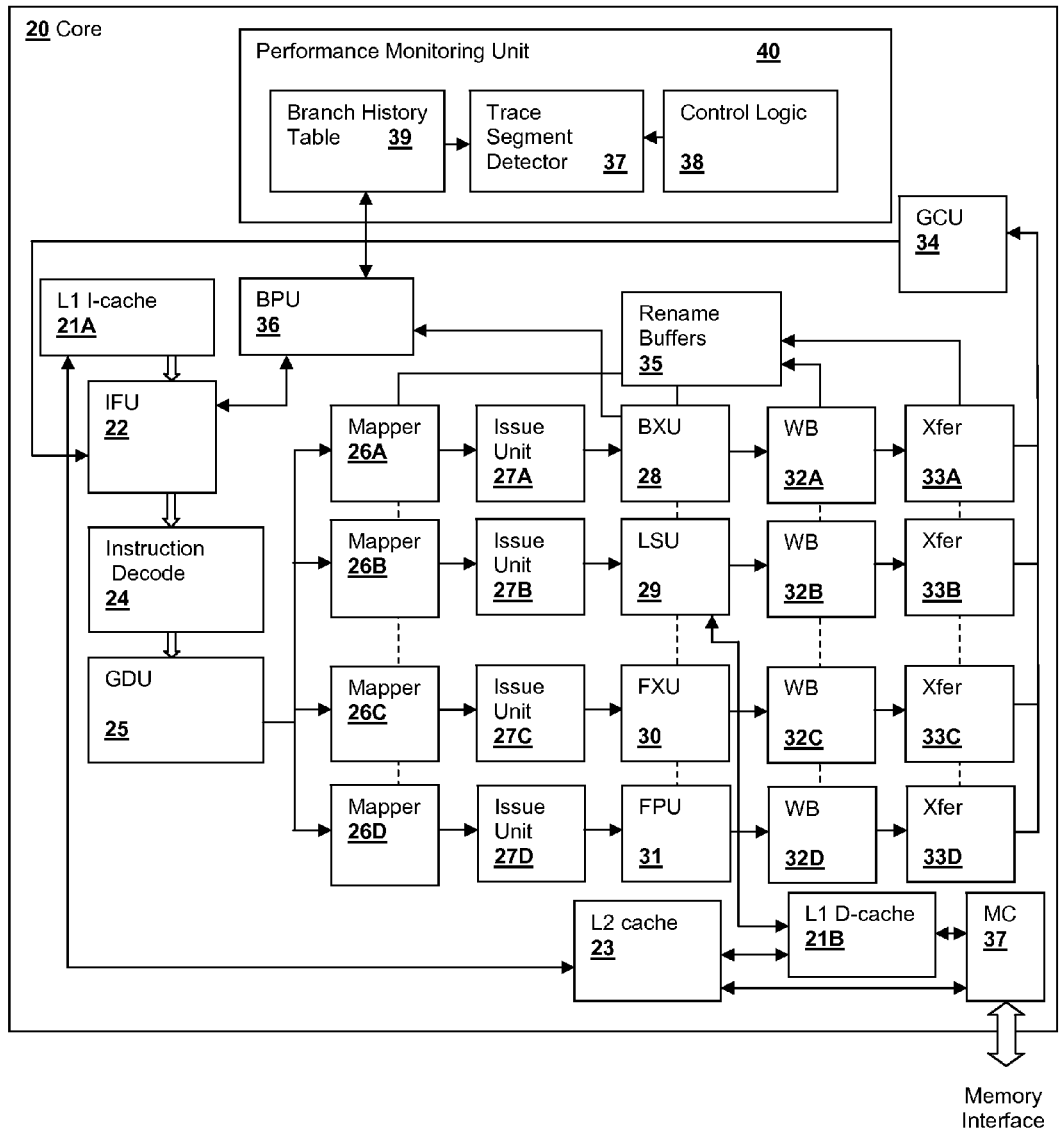
FIG. 2 is a block diagram illustrating details of processor cores 20A-20B in the computer system of FIG. 1.

FIG. 2 illustrates details of a processor core 20 that can be used to implement processor cores 20A-20B of FIG. 1. Core 20 includes an instruction fetch unit (IFU) 22 that fetches instruction streams from L1 I-cache 21A, which, in turn receives instructions from an L2 cache 23. L2 Cache is coupled to a memory controller (MC) 37 that couples processor core 20 to a memory interface. Instructions fetched by IFU 22 are provided to an instruction decode unit 24. A global dispatch unit (GDU) 25 dispatches the decoded instructions to a number of internal processor pipelines. The processor pipelines each include a mapper 26A-26D, an issue unit 27A-27D, an execution unit, one of branch execution unit (BXU) 28, load/store unit (LSU) 29, fixed-point unit (FXU) 30 or floating point unit (FPU) 31, a write back unit (WB) 32A-32D and a transfer unit (Xfer) 33A-33D. A global completion unit (GCU) 34 provides an indication when result transfer is complete to IFU 22. Mappers 26A-26D allocate rename buffers 35 to represent registers or "virtual registers" indicated by instructions decoded by instruction decode unit 24 so that concurrent execution of program code can be supported by the various pipelines. Values in registers located in rename buffers are loaded from and stored to L1 D-cache 21B, which is coupled to L2 cache 23. Core 20 also supports out-of-order execution by using rename buffers 35, as mappers 26A-26D fully virtualize the register values. WBs 32A-32D write pipeline results back to associated rename buffers 35, and Xfers 33A-33D provide an indication that write-back is complete to GCU 34 to synchronize the pipeline results with the execution and instruction fetch process.

In illustrated core 20, a performance monitoring unit 40 gathers information about operation of processor core 20, including performance measurements, which in the illustrative embodiment are trace segment analysis results gathered by a trace segment detector 37. Trace segment detector uses branch prediction and branch prediction accuracy information provided by a branch history table 39, which receives information from a branch prediction unit 36 that may be provided only for performance monitoring, or which may also be used for speculative execution or speculative pre-fetching by processor core 20.

As execution of a program proceeds, branch prediction unit 36 updates branch history table 39 with a list of branch instructions that have been encountered, an indication of the most likely branch result for each of the branch instructions, and optionally a confidence level of the branch prediction. Trace segment detector 37 uses the information in branch history table 39 to distinguish segments of programs, and to provide useful information such as the number of times a particular segment has been executed. Since, with a few exceptions, branch instructions completely delineate patterns of program flow in which all instructions in a given segment are executed when the segment is entered, it is only necessary to collect the branch information in order to completely describe the segments of a program. In the present invention, a mechanism prevents trace segment detector from constructing segments, i.e., from analyzing the information in branch history table 39 until sufficient information has been updated for the current program task session. A control logic 38, in accordance with an embodiment of the present invention, controls operation of trace segment detector 37, so that trace segment detector 37 only uses information from branch history table 39 when the information is applicable to execution of the program for which performance measurements are being made, as will be described in further detail below.

Figure 3:
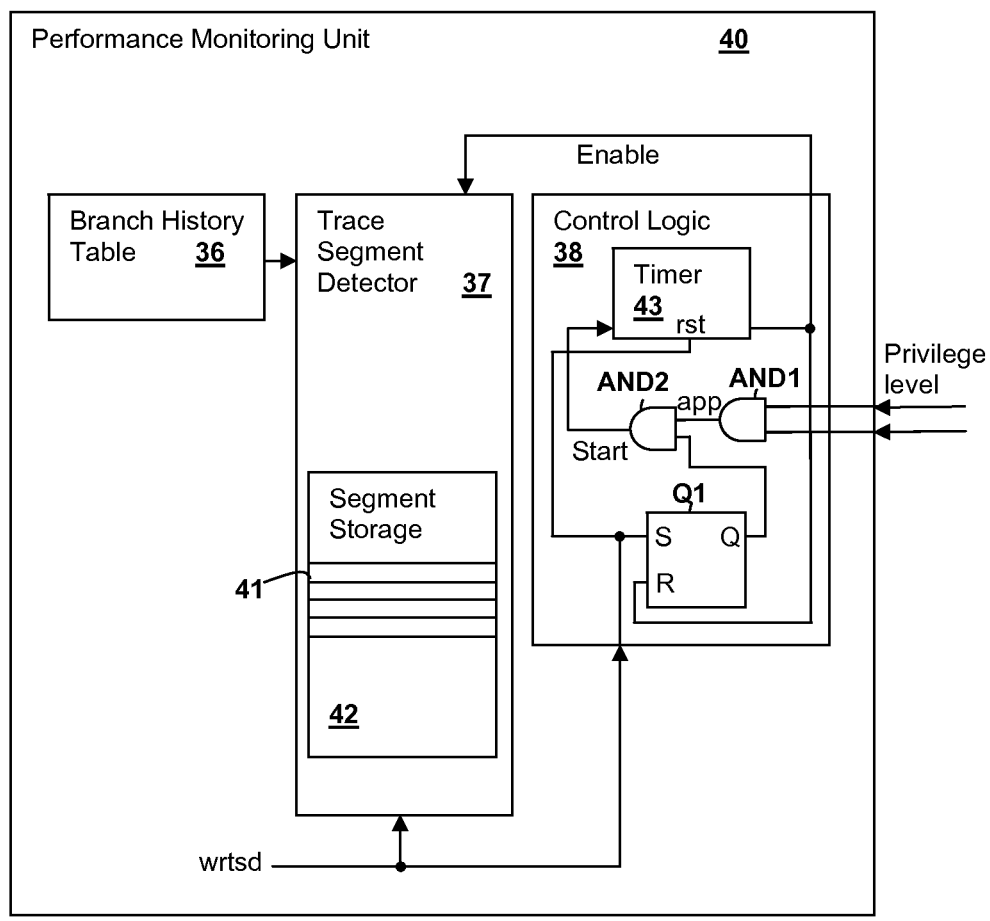
FIG. 3 is a simplified electrical schematic showing details of performance monitoring unit 40 of FIG. 2 in accordance with an embodiment of the present invention.

Referring now to FIG. 3, details of performance monitoring unit 40 are shown, in accordance with an embodiment of the invention. Branch history table 36 provides branch execution information and branch prediction information to trace segment detector, which builds segment entries 41 in segment storage 42. Segment entries 41 in the depicted embodiments are lists of addresses of branch instructions for which the branch was taken in the corresponding segment and a counter that indicates how many times the segment has been executed. Other or alternative information may be provided within segment entries 41 to provide additional information, or alternative descriptions permitting unique identification of the branch instructions within the segment. For example, segment entries 41 may include the target addresses of branch indirect instructions. Further, the techniques of the present invention may be applied to other hardware performance measuring facilities and control use of the measurement results produced thereby using the same techniques described below. Trace segment detector 37 begins building segment entries 41 in response to a control signal Enable provided from control logic 39. Control signal Enable indicates that a predetermined delay time has expired from the start of execution of the currently executing program. The delay prevents building segment entries 41 from invalid data in branch history table 36 either left from the last program, or caused by execution of a supervisor (OS) or hypervisor program.

Privilege level signals, generally provided from a thread state register, are provided to a logical AND gate AND1 which determines when execution of the processor has entered application level (privilege level 11) and generates an indication app that the processor is executing at application privilege level. Another logical AND gate AND2 qualifies indication app with the output of a latch Q1 that is set when a write operation to trace segment detector 37 has occurred (wrtsd asserted), indicating that the hypervisor has restored the state of trace segment detector 37, which occurs during hypervisor privilege level execution prior to the assertion of indication app. When latch Q1 has been set and indication app is asserted, a control signal Start is asserted, causing a timer 43 to begin timing the predetermined delay time. At the end of the predetermined delay time, control signal Enable is asserted, and trace segment detector 37 begins building trace segments 41 from the information in branch history table 36. Control signal Enable remains asserted until another write to trace segment detector 37 is detected (wrtsd asserted), indicating that the hypervisor has restored another context. While in the illustrative embodiment a time period timed by delay timer 43 is used, alternative embodiments of the present invention may count instruction cycles, or perform convergence evaluations of branch history table 36, to determine when the branch history information is of sufficient quality to begin analyzing the segments after the application privilege level has been entered. Further, while the illustrative embodiment is directed toward program trace analysis, the present invention is applicable to other performance monitoring techniques, such as workload measurements, thread or program processor resource usage accounting, and other performance monitor features that may not necessarily be accurately maintained across program context switches, either due to hardware limitations, or storage and I/O overhead limitations.

Figure 4:
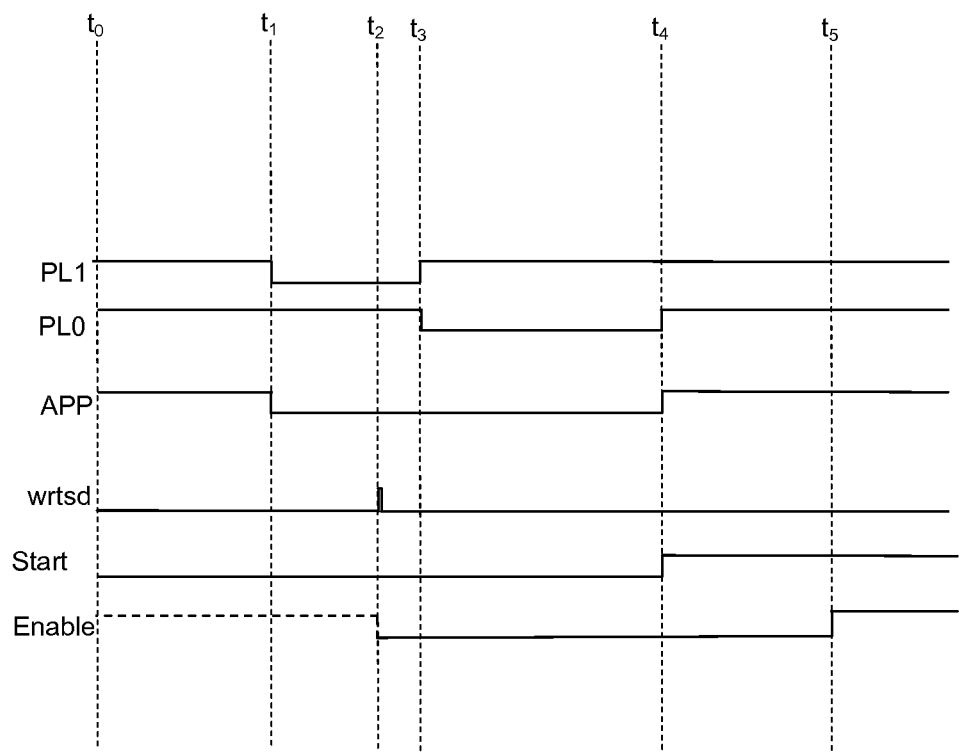
FIG. 4 is a timing diagram illustrating signals within performance monitoring unit 40 of FIG. 3.

Referring now to FIG. 4, operation of performance monitoring unit 40 is illustrated by showing signals within performance monitoring unit 40 in a timing diagram. Between times $t_0$ and $t_1$, the processor is operating at application privilege level (PL1:PL0=11). At time $t_1$, the processor executes at hypervisor privilege level (PL1:PL0=10) and the hypervisor initiates a context swap. At time $t_2$, the hypervisor restores the state of the trace segment detector (wrtsd asserted), and control signal Enable is de-asserted if previously asserted. From time $t_2$ until time $t_3$, the processor remains at hypervisor privilege level and from $t_3$ until time $t_4$, the processor is at supervisor privilege level, during which time control signal Enable remains de-asserted. Finally, at time $t_4$ the processor begins executing at application privilege level, indication app is asserted, and control signal Start is asserted to start timer 43. At time $t_5$, the predetermined time period has elapsed and control signal Enable is asserted to enable trace segment detector 37.

Figure 5:
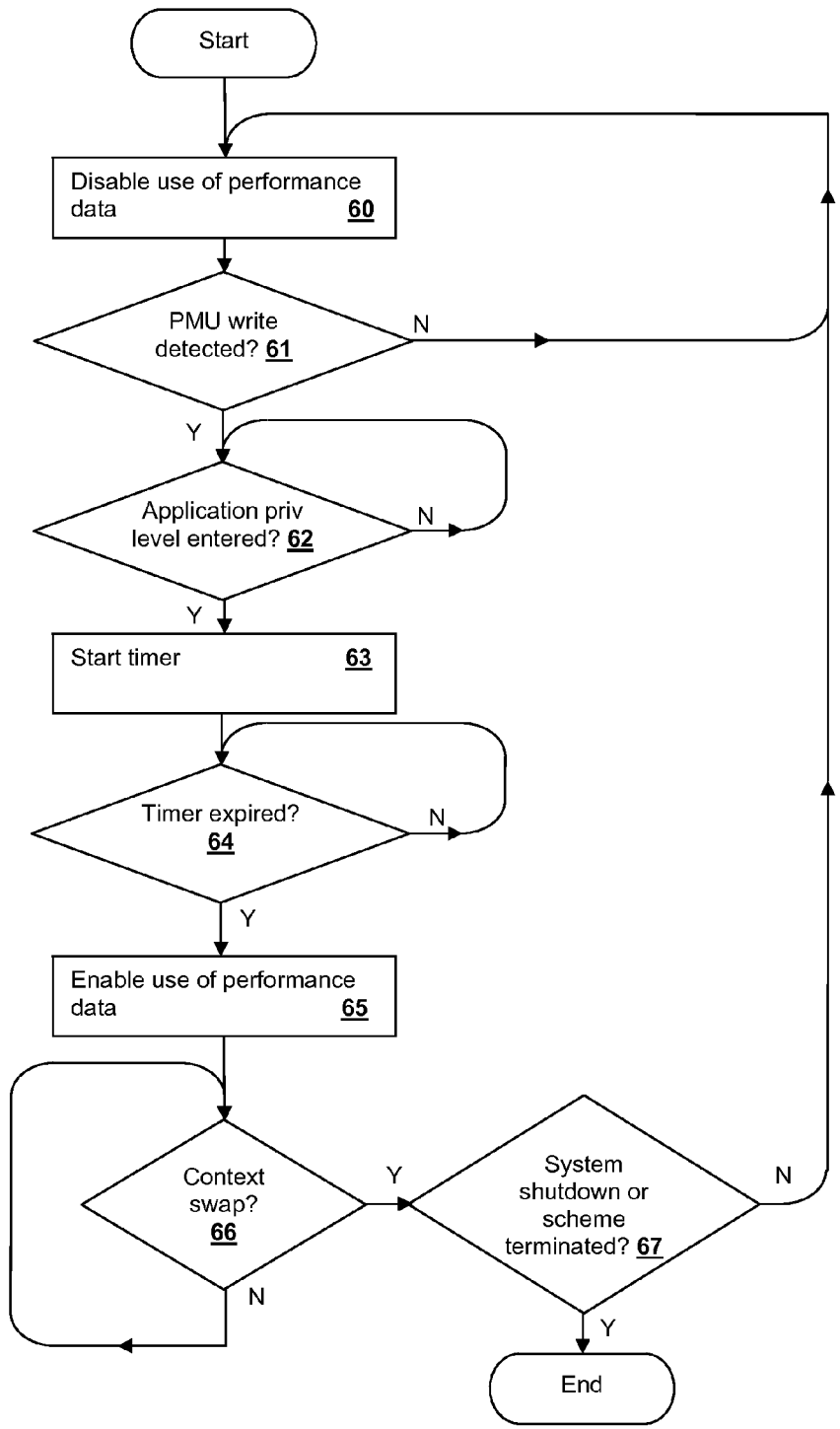
FIG. 5 is a flowchart of a method of performance monitoring within a processor core in accordance with an embodiment of the present invention.

Referring now to FIG. 5, a method of performance monitoring in accordance with an embodiment of the present invention is illustrated in a flowchart. Initially, the use of performance data is disabled (step 60). When a write to a facility in the performance monitoring unit is detected (decision 61) and the application privilege level is subsequently entered (decision 62), then the timer is started (step 63). Once the timer has expired (decision 64), the use of the performance data is enabled (step 65). The use of the performance data remains enabled until another context switch is detected (decision 66), when execution is directed to step 60 again. Steps 60-66 are repeated until the system is shut down or the scheme is terminated (decision 67), with the timer determination in decision 64 being subject to task/context switches that restart the timer.

As noted above, portions of the present invention may be embodied in a computer program product, which may include firmware, an image in system memory or another memory/cache, or stored on a fixed or re-writable media such as an optical disc having computer-readable code stored thereon. Any combination of one or more computer readable medium (s) may store a program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of ensuring accuracy of performance measurements of a program executing within a computer system, the method comprising:
   measuring performance of the program using a dedicated hardware performance monitor unit within a processor of the computer system;
   receiving, by the processor, an indication that a execution of the program is being resumed; and
   postponing analysis of an output of the hardware performance monitor unit until an application privilege level of the computer system has been entered, indicating that the program has resumed execution.

2. The method of claim 1, wherein the postponing delays use of the performance measurements until a predetermined time period after the application privilege level of the computer system has been entered.

3. The method of claim 1, further comprising:
   receiving an indication that a supervisory program has written to a facility that collects data used by the performance measurements;
   responsive to the receiving of the indication that the supervisory program has written to the facility, setting a first state of a control latch that controls use of the data collected by the facility, wherein in the first state, the hardware performance monitoring unit does not use the collected data;
   receiving an indication that the computer system has entered the application privilege level;
   responsive to the receiving the indication that the computer system has entered the application privilege level, determining whether the first state of the control circuit is set; and
   responsive to determining that the first state of the control circuit is set and the receiving the indication that the computer system has entered the application privilege level, setting a second state of the control latch, wherein the hardware performance monitoring unit uses the collected data.

4. The method of claim 3, further comprising responsive to determining that the first state of the control circuit is set and the receiving the indication that the computer system has entered the application privilege level, starting a delay timer that, upon expiration, enables use of the collected data by the hardware performance monitoring unit, and wherein the setting the second state of the control latch is performed in response to expiration of the delay timer.

5. The method of claim 4, wherein the starting a delay timer is restartable, whereby if the predetermined time has not elapsed, responsive to receiving a second indication that execution of the program is being suspended, the delay time is restarted to provide the indication that the predetermined time period has elapsed from a time of the receiving the second indication.

6. The method of claim 1, wherein the measuring traces an execution path of the program by adding branch instructions encountered during the execution of the program to a current trace.

7. The method of claim 6, wherein the measuring determines whether a branch took a direction predicted for the branch by a hardware branch prediction unit, wherein the measuring adds the branch to the current trace if the predicted direction was taken, and wherein the measuring adds the branch to a new trace segment if the predicted direction was not taken.

8. A computer system comprising:
   at least one processor core; and
   at least one memory coupled to the processor core for storing program instructions for execution by the processor, wherein the program instructions form a program executing within the computer system;
   a performance monitoring unit for monitoring performance of the program; and
   a control circuit that receives an indication that execution of the program is being resumed, and responsive to receiving the indication that the execution of the program is being resumed, postpones analysis of an output of the performance monitoring unit until an application privilege level of the computer system has been entered, indicating that the program has resumed execution.

9. The computer system of claim 8, wherein the control circuit delays use of the performance measurements until a predetermined time period after the application privilege level of the computer system has been entered.

10. The computer system of claim 8, wherein the control circuit further receives an indication that a supervisory program has written to a facility that collects data used by the performance measurements, wherein the control circuit, responsive to the receiving of the indication that the supervisory program has written to the facility, sets a first state of a control latch that controls use of the data collected by the facility by the performance monitoring unit, wherein in the first state, the performance monitoring unit does not use the collected data, wherein the control circuit receives an indication that the computer system has entered the application privilege level, and wherein the control circuit, responsive to the receiving the indication that the computer system has entered the application privilege level, determines whether the first state of the control circuit is set, and responsive to determining that the first state of the control circuit is set and the receiving the indication that the computer system has entered the application privilege level, sets a second state of the control latch, whereby the performance monitoring unit is enabled to use the collected data.

11. The computer system of claim 10, wherein the control circuit further comprising responsive to determining that the first state of the control circuit is set and the receiving the indication that the computer system has entered the application privilege level, starts a delay timer that, upon expiration, enables use of the collected data by the performance monitoring unit, and wherein the control circuit sets the second state of the control latch in response to expiration of the delay timer.

12. The computer system of claim 11, wherein the delay timer is restartable, and wherein the control circuit, responsive to receiving a second indication that execution of the program is being suspended, restarts the delay timer to provide the indication that the predetermined time period has elapsed from a time of the receiving the second indication.

13. The computer system of claim 8, wherein the performance monitoring unit traces an execution path of the program by adding branch instructions encountered during the execution of the program to a current trace.

14. The computer system of claim 13, further comprising a branch prediction unit, and wherein the performance monitoring unit determines whether a branch took a direction predicted by the branch prediction unit, wherein the performance monitoring unit adds the branch to the current trace if the predicted direction was taken, and adds the branch to a new trace segment if the predicted direction was not taken.

15. A processor core for executing a program, the processor core comprising:
   a performance monitoring unit for monitoring performance of the program; and
   a control circuit that receives an indication that execution of the program is being resumed, and responsive to receiving the indication that the execution of the program is being resumed, postpones analysis of an output of the performance monitoring unit until an application privilege level of the computer system has been entered, indicating that the program has resumed execution.

16. The processor core of claim 15, wherein the control circuit delays use of the performance measurements until a predetermined time period after the application privilege level of the computer system has been entered.

17. The processor core of claim 15, wherein the control circuit further receives an indication that a supervisory program has written to a facility that collects data used by the performance measurements, wherein the control circuit, responsive to the receiving of the indication that the supervisory program has written to the facility, sets a first state of a control latch that controls use of the data collected by the facility by the performance monitoring unit, wherein in the first state, the performance monitoring unit does not use the collected data, wherein the control circuit receives an indication that the computer system has entered the application privilege level, and wherein the control circuit, responsive to the receiving the indication that the computer system has entered the application privilege level, determines whether the first state of the control circuit is set, and responsive to determining that the first state of the control circuit is set and the receiving the indication that the computer system has entered the application privilege level, sets a second state of the control latch, whereby the performance monitoring unit is enabled to use the collected data.

18. The processor core of claim 17, wherein the control circuit further comprising responsive to determining that the first state of the control circuit is set and the receiving the indication that the computer system has entered the application privilege level, starts a delay timer that, upon expiration, enables use of the collected data by the performance monitoring unit, and wherein the control circuit sets the second state of the control latch in response to expiration of the delay timer.

19. The processor core of claim 18, wherein the delay timer is restartable, and wherein the control circuit, responsive to receiving a second indication that execution of the program is being suspended, restarts the delay timer to provide the indication that the predetermined time period has elapsed from a time of the receiving the second indication.

20. The processor core of claim 15, wherein the performance monitoring unit traces an execution path of the program by adding branch instructions encountered during the execution of the program to a current trace.

21. The processor core of claim 20, further comprising a branch prediction unit, and wherein the performance monitoring unit determines whether a branch took a direction predicted by the branch prediction unit, wherein the performance monitoring unit adds the branch to the current trace if the predicted direction was taken, and adds the branch to a new trace segment if the predicted direction was not taken.

* * * * *